E. K. HOOD & W. J. CAMPBELL.
STERILIZER.
APPLICATION FILED MAR. 29, 1909.
1,011,792.
Patented Dec. 12, 1911.
4 SHEETS—SHEET 2.
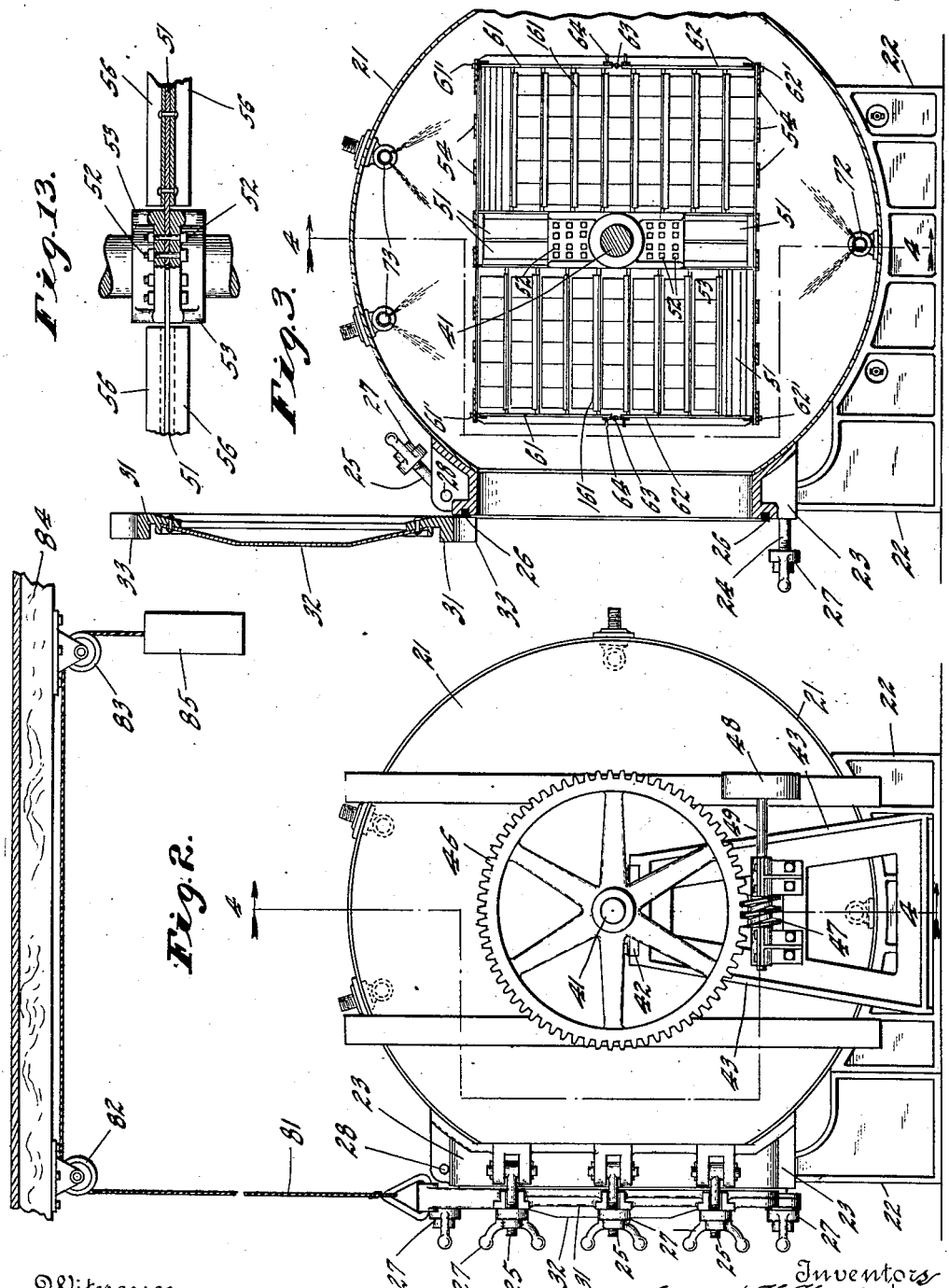

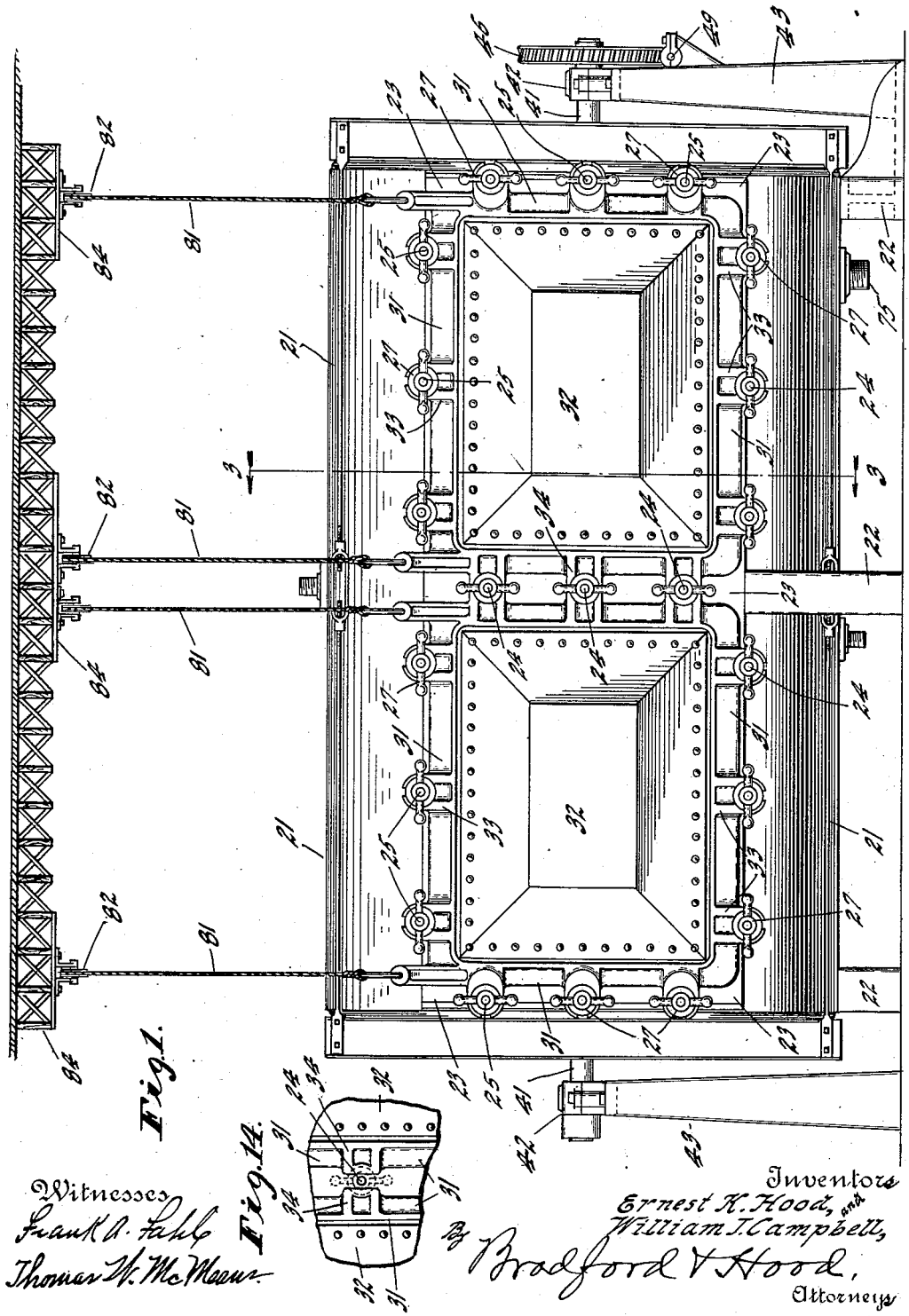

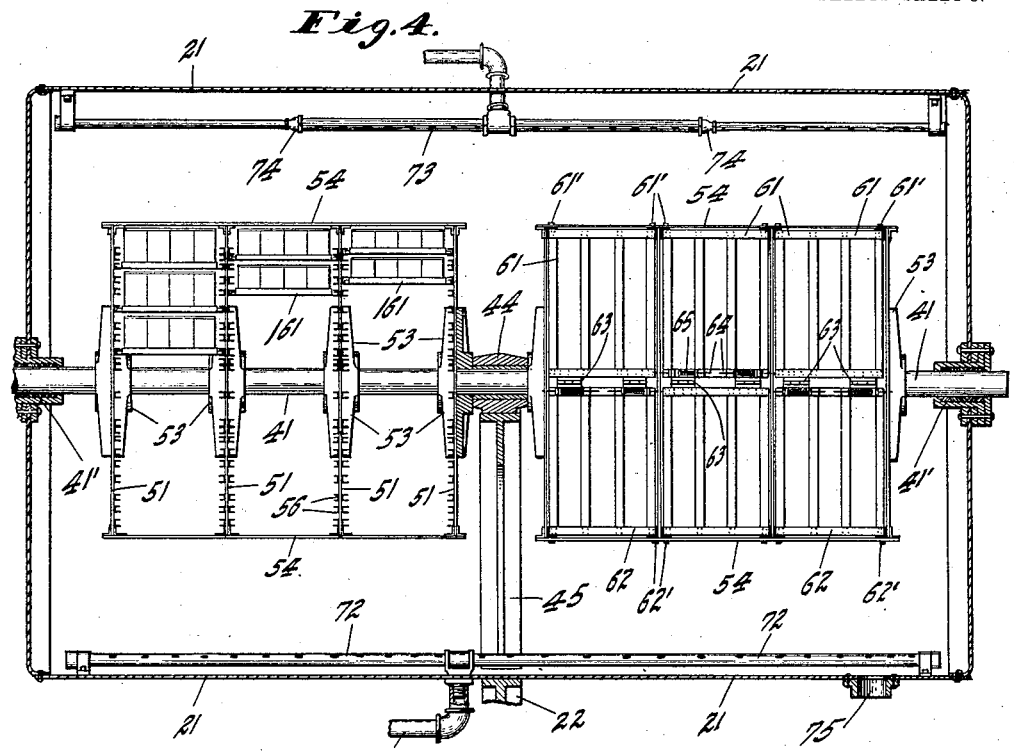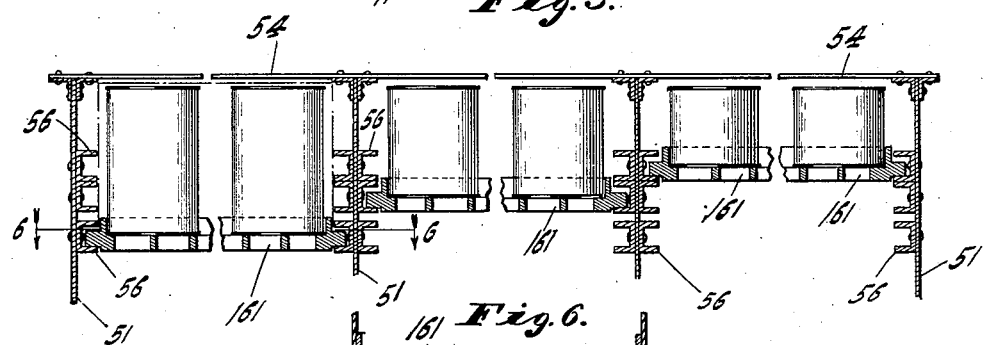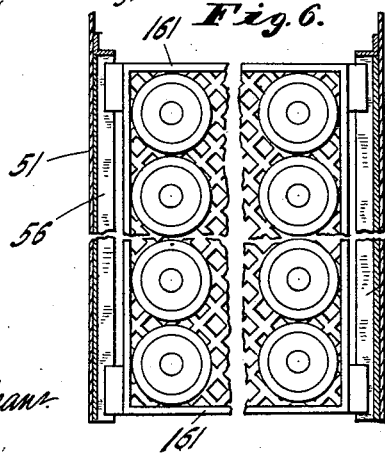

E. K. HOOD & W. J. CAMPBELL.
STERILIZER.
APPLICATION FILED MAR. 29, 1909.
1,011,792.
Patented Dec. 12, 1911.
4 SHEETS—SHEET 4.
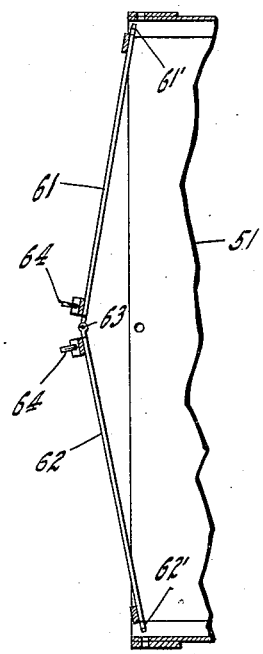
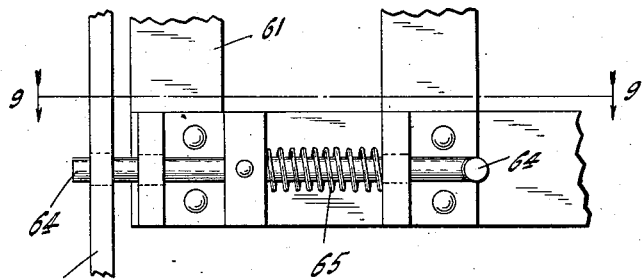
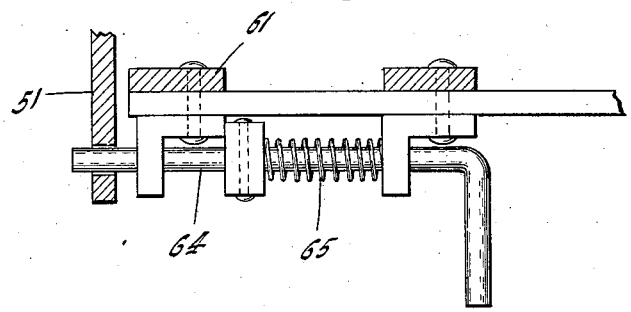
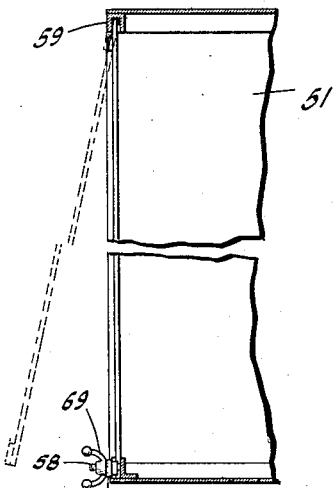
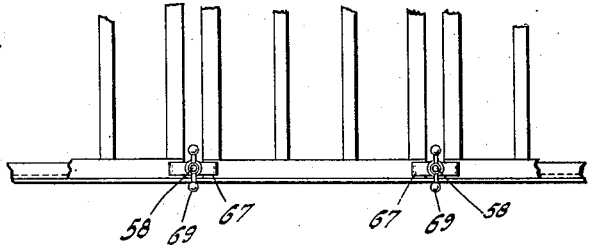
Witnesses
Frank A. Fahl
Thomas W. McMeans
Inventors
Ernest K. Hood, and
William J. Campbell,
By Bradford & Hood,
Attorneys

UNITED STATES PATENT OFFICE.

ERNEST K. HOOD AND WILLIAM J. CAMPBELL, OF INDIANAPOLIS, INDIANA, ASSIGNORS TO CLIMAX MACHINERY COMPANY, OF INDIANAPOLIS, INDIANA, A CORPORATION OF INDIANA.

STERILIZER.

1,011,792.  Specification of Letters Patent.  Patented Dec. 12, 1911.

Application filed March 29, 1909. Serial No. 486,474.

*To all whom it may concern:*

Be it known that we, ERNEST K. HOOD and WILLIAM J. CAMPBELL, citizens of the United States, residing at Indianapolis, in the county of Marion and State of Indiana, have invented certain new and useful Improvements in Sterilizers, of which the following is a specification.

Our present invention consists in certain improvements upon that class of apparatus wherein canned goods are placed, at an appropriate stage of their treatment, for the purpose of sterilizing the same.

The apparatus illustrated has been particularly designed for use in the preparation of condensed milk; but it is adapted for use with a great variety of canned goods.

An apparatus embodying our said invention will be first fully described, and the novel features thereof then pointed out in the claims.

Referring to the accompanying drawings, which are made a part hereof, and on which similar reference characters indicate similar parts, Figure 1 is a front elevation of an apparatus of the character in question embodying our said invention; Fig. 2 an end elevation thereof; Fig. 3 a transverse vertical sectional view at the point indicated by dotted line 3 3 in Fig. 1, one of the doors however being raised, as when the apparatus is opened for the purposes of having cans placed therein; Fig. 4 a longitudinal vertical sectional view at the point indicated by the broken lines 4 4 in Figs. 2 and 3; Fig. 5 a fragmentary sectional view, on an enlarged scale, similar to a portion of Fig. 4 but with intermediate portions broken away to permit the scale in question to be used, and also illustrating the arrangement for different sized cans; Fig. 6 a detail sectional plan view as seen when looking downwardly from the broken line 6 6 in Fig. 5; Fig. 7 a detail view illustrating the cage doors or keepers which form means of holding in the trays carrying the cans, similar to a portion of Fig. 3 but showing the said means in the position it occupies just before being fastened; Fig. 8 a fragmentary view of one of the fastening bolts and immediately adjacent parts, similar to a portion of Fig. 4 but on a very much enlarged scale; Fig. 9 a plan view of said bolt as seen when looking downwardly from the broken line 9 9 in Fig. 8; Figs. 10, 11 and 12 detail views showing an alternative construction of the cage doors or keepers forming the means for holding in the trays; Fig. 13 a detail view showing the mounting of the main cage ends or plates on the shaft, and Fig. 14 a detail view showing how a single set of intermediate stud-bolts and their jam-nuts hold the adjacent edges of two doors.

In this apparatus a drum 21 is mounted on suitable supports 22, and remains stationary. This drum is similar in character to a steam boiler, except that it has an open side, the opening wherein is surrounded by a border frame or door-jamb 23, and said opening is adapted to be closed by a suitable door. The drum may be of any desired length, but if it is of a length which much exceeds its diameter it is preferable to have a plurality of doors; or, in other words, to divide the drum into sections, each section having its own door. In the apparatus illustrated the drum consists of two sections, and consequently has two doors, as is best shown in Fig. 1. The door-jamb or door-opening border-casing 23 should be, because of the considerable strain involved in the use of this apparatus, and the unequal stresses resulting from the position and arrangement of the parts, of a very strong and durable character. We prefer therefore to make it a heavy steel casting, and rivet the same strongly to the edge of the metal forming the body of the drum. Each of these border castings has attached thereto a number of clamping bolts 24 and 25, by means of which the doors are firmly clamped in place when closed in position for use. In order to make the drum steam tight, a packing 26 is provided, which is placed in a groove in the face of the door-jamb, as best shown in Fig. 3, and against which the door will be tightly forced by the clamping nuts 27 on bolts 24 and 25. The bolts 25 (being those at the top and ends) are hinged on pivots 28, so that they may be swung back when it is desired to raise the doors, as is best shown in Figs. 2 and 3; while the bolts 24 at the bottom and at points intermediate the doors are stud-bolts, for reasons which will presently be explained.

The doors are of suitable form to cover the openings in the side of the drum, and are preferably each formed of a heavy frame casting 31, and a plate 32 of heavy sheet metal riveted thereto, as is best shown in Figs. 1 and 3. The frame 31 has a number of ears 33 and 34 which pass astride the clamping bolts 24 and 25, and with which the clamping nuts 27 will engage. The operation is, when it is desired to open one of these doors, that the clamping nuts are loosened, and the upper and outer side nuts and bolts swung back to the position shown in Fig. 3, when the doors may be raised free from the bolts, leaving access to the openings in the side of the drum, as also shown in Fig. 3. When it is desired to close the drum, the doors are lowered to the position shown in Fig. 1, and the clamping bolts and nuts are replaced and tightened up, all as will be readily understood.

As above stated, a part of the clamping bolts are stud bolts, and a part are hingedly mounted. Stud bolts 24 are at the bottoms of the doors, and thus receive and support said doors as they reach the final position when being closed. Similar stud bolts are placed in frames between the adjacent edges of the doors. The doors have ears on all four sides, the ears 33 at the top and bottom and one side of each being bifurcated or having slits therein and passing astride the various clamping bolts,—said clamping bolts at the outer sides and tops being swung into the slits after the door is put in position. The ears 34 on the sides of the doors next each other are not slitted, and are of a length that when the doors are in place said ears are just that distance apart which is equal to the diameters of the bolts. The clamping nuts 27 (or washers therefor) are sufficiently large to overlap both the adjacent ears, so that a single clamping bolt and nut will operate upon the adjacent edges of two doors. This is important, for the reason that it is necessary to have the doors as close together as is possible, and if two separate sets of clamping bolts and nuts were used they would occupy too much room, and leave a large amount of waste space within the drum; whereas, by the present arrangement, the space between the doors is only about equal to the necessary space for shaft bearings within the drum, so that the construction is rendered as economical in this respect as is possible.

Extending longitudinally through the center of the drum is a shaft 41 which passes out through glands 41' in the ends of the drum and rests in bearings 42 on pillow block 43 outside the ends; and, as best shown in Fig. 4, has an intermediate bearing 44 between the sections carried by a suitable support or pillow block 45. As the cages carried by this shaft, especially when loaded, are of great weight, the shaft needs to be of considerable size and strongly supported. At one end of the apparatus the shaft 41 is provided with a gear wheel 46 by which it is driven. A desirable form of gearing, as shown in Figs. 1 and 2, is that known as the worm gear, which has the advantages of great power, slow speed, and of dispensing with the necessity of the use of any brake. A worm 47 engages with this large worm-wheel 46, and is driven from any suitable source of power (not shown), as by a belt running to pulley 48 on worm-shaft 49. A train of spur gearing might be substituted for this worm gear if desired, but the worm gear, when properly made, is, in our opinion, preferable.

Within the drum, and carried by the shaft, are the cages containing the articles to be treated. These ends and partitions of these cages consist of heavy plates 51 made in pairs, the edges of which plates are strongly secured by bolts 52 between heavy hubs 53 on the shaft, said hubs being of a character to embrace and securely hold said plates. The sides of the cages consist of suitable bars 54 secured to the plates 51 at their edges. In the character of work which this apparatus performs the interior parts rust rapidly under the action of the steam, and need to be occasionally renewed. By the construction illustrated and just described, it is easily possible to do this, as by simply taking the bolts out of the flanges of the hubs, the plate and bar members may be removed and new ones inserted in their place. Each one of these plates 51 has a number of shelves for tray supports 56, which, as best shown in Fig. 5, are preferably in the form of channels, and which receive the trays or shelves carrying the cans. The trays 61 are of a character to receive the cans to be treated, and to freely slip in and out of the ways 56. Said ways being positioned properly for the purpose, any size of cans can be treated. This is illustrated in Fig. 5 where, by the placing of the trays in different ones of the various ways, these different sizes of cans are shown as in position for treatment. Obviously this may be adjusted as desired by simply shifting the trays or shelves from one set of ways or supports to another.

In operation, the shaft 41 is revolved until the cages therein are in the position shown in Fig. 3, when the trays are in horizontal position. The tray holders are then removed, and the trays taken out through the opening in the side of the drum left by the raising of the door. After the cans are removed from the trays they are again loaded with cans for treatment, and reinserted, the holders put in place, and the cage revolved one-half a revolution, and the operation is repeated as to the other side. The door is then closed, and the machine is set in motion, the shaft and cages with the trays and contents being thus slowly revolved, which has the effect, as will be readily understood, of agitating the contents of the cans as they pass from one point to another—there being sufficient "slack" (or spare room) in the spaces containing the cans to permit them to slide a short distance by gravity, as the trays containing them reach a proper inclination, which imparts a slight shock or agitation to the contents.

The holders consist, as best shown in Figs. 3 and 7, of bars consisting of two parts 61 and 62 pivoted together at a central point 63 and provided with latching ends 61' and 62' which enter perforations in the adjacent portion of the frame of the cage. When these ends have been brought into relation with said perforations, then the central portion of the bar is pushed inwardly, into the position indicated in Fig. 3, and the spring-actuated keepers 64 thereon are permitted to engage with a suitable perforation in the adjacent side of the frame—the spring 65 holding said keeper into engagement. In the alternative construction illustrated in Figs. 10, 11 and 12, the cage doors or means for holding in the trays 161, instead of being made of parts hinged together, are formed rigid, with the upper edges extending under an overhanging flange 59 on the cage, and are held in at the bottom by a pivoted clamping-bar 67, mounted on stud-bolt 58, and adapted to be clamped down by nut 69.

After the cages have been loaded with cans, and the doors closed, the necessary heat is applied by means of steam which is introduced into the drum. This is introduced through steam pipes 71 leading from any suitable source of steam supply, and passing in through the shell of the boiler 21, preferably at approximately the center thereof. These communicate with an interior pipe or pipes 72; and each of these has a large number of perforations, through which the steam emerges, as indicated in Fig. 3. As the cages slowly revolve, carried by shaft 41, the steam will pass between the several cans, and thoroughly heat the same, and sterilize the contents thereof. When the cans have been sufficiently treated by the steam, the steam supply is shut off, and cold water is turned on through other pipes 73, and the contents of the apparatus thus cooled sufficiently to enable the same to be handled. These last named pipes are shown as made up of sections of different sizes united by reducing couplings 74. The water will run off through a drain pipe 75 (a fragment only of which is shown), which is opened at the appropriate time. After the cans have been thus cooled, the cages are stopped, the doors opened, the tray keepers disengaged, and the trays bearing the cans removed and the cans carried away. The trays are reloaded with cans and reinserted, the doors closed, and the operation repeated, and so on indefinitely.

The doors are very heavy, and we have therefore provided, as a means for handling the same, ropes 81 running over sheaves or pulleys 82 and 83 carried by an overhead framework 84 and having counterbalancing weights 85 at the opposite ends. These weights being of substantially the same weight as the doors to which they are attached much reduces the difficulty of the operation of the doors, and renders the same comparatively easy.

Having thus fully described our said invention, what we claim as new and desire to secure by Letters Patent, is:—

1. The combination, in a sterilizer, of a drum, a shaft centrally arranged therein, cages mounted on said shaft, driving mechanism exterior to the drum engaging with said shaft whereby the same and the cages thereon are revolved, a plurality of tray supports so secured in said cages that the trays may be positioned to carry cans of different sizes, trays mounted in said tray supports, removable holders whereby the trays are retained in said tray supports in the cages, an opening in the side of the drum through which the trays and cans may be introduced and withdrawn, a door for closing said opening, and means for manipulating said door.

2. The combination, in a sterilizer, with cages for containing the trays, of a plurality of tray supports fixedly secured to the walls of said cages at varying predetermined distances whereby the trays may be placed nearer to or farther from each other and cans of varying sizes thus accommodated, said trays, and means for holding said trays in the tray supports.

3. The combination, in a sterilizer, of a drum, door openings in the sides thereof, doors to said openings, a shaft passing centrally through the drum longitudinally, and cages mounted on said shaft, said cages consisting of pairs of plates meeting centrally on said shaft and flange hubs on said shaft to which said plates are bolted, tray supports secured to the sides of said plates, inclosing framework surrounding the same, and removable keepers mounted in said framework in front of the tray-supports whereby the latter may be secured in place and the cans thus held in position within the cage while the latter revolves.

4. The combination, in a sterilizer, with the drum and its shaft, of cages mounted on said shaft consisting of pairs of plates meeting centrally on said shaft, flange hubs on said shaft to which said plates are bolted, suitable framework surrounding said plates and forming outer sides of said cage, tray supports secured to the sides of said plates opposite each other, trays arranged to be placed on said tray supports, and removable keepers attached to the cages in front of said tray supports.

In witness whereof, we have hereunto set our hands and seals at Indianapolis, Indiana, this twentythird day of March, A. D. one thousand nine hundred and nine.

ERNEST K. HOOD. [L. S.]
WILLIAM J. CAMPBELL. [L. S.]

Witnesses:
   CHESTER BRADFORD,
   THOMAS W. MCMEANS.

---

Copies of this patent may be obtained for five cents each, by addressing the "Commissioner of Patents. Washington, D. C."